(12) United States Patent
Park

(10) Patent No.: US 8,374,176 B2
(45) Date of Patent: Feb. 12, 2013

(54) METHOD AND APPARATUS FOR PROVIDING INTERNET PROTOCOL DATACASTING (IPDC) SERVICE, AND METHOD AND APPARATUS FOR PROCESSING IPDC SERVICE

(75) Inventor: Jeong-hoon Park, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1401 days.

(21) Appl. No.: 11/774,839

(22) Filed: Jul. 9, 2007

(65) Prior Publication Data

US 2008/0008175 A1    Jan. 10, 2008

Related U.S. Application Data

(60) Provisional application No. 60/818,986, filed on Jul. 7, 2006.

(30) Foreign Application Priority Data

Mar. 27, 2007  (KR) .......................... 10-2007-0030050

(51) Int. Cl.
*H04L 12/28* (2006.01)
(52) U.S. Cl. .................. 370/389; 370/395.21; 709/231; 709/247
(58) Field of Classification Search .................. 370/389, 370/476, 466, 352, 395.21; 709/231, 247
See application file for complete search history.

(56) References Cited

U.S. PATENT DOCUMENTS

| 6,763,035 | B1* | 7/2004 | Koskelainen et al. ........ 370/466 |
| 6,967,964 | B1 | 11/2005 | Svanbro et al. | |
| 7,707,607 | B2 | 4/2010 | Park | |
| 7,818,397 | B2* | 10/2010 | Jiang et al. ..................... 709/217 |
| 7,924,323 | B2* | 4/2011 | Walker et al. ............... 348/231.2 |
| 2002/0087999 | A1* | 7/2002 | Kashima ........................ 725/100 |
| 2002/0103938 | A1* | 8/2002 | Brooks et al. ................. 709/247 |
| 2002/0124091 | A1* | 9/2002 | Kurose et al. ................. 709/228 |
| 2002/0167992 | A1* | 11/2002 | Das et al. ....................... 375/146 |

(Continued)

FOREIGN PATENT DOCUMENTS

| JP | 2002118826 A | 4/2002 |
| JP | 2003110618 A | 4/2003 |

(Continued)

OTHER PUBLICATIONS

International Search Report and Written Opinion of ISA for Application No. PCT/KR2007/003274 dated Oct. 11, 2007.

(Continued)

*Primary Examiner* — Dang Ton
*Assistant Examiner* — Mandish Randhawa
(74) *Attorney, Agent, or Firm* — Sughrue Mion, PLLC

(57) ABSTRACT

Provided are a method and apparatus for providing an Internet Protocol Datacasting (IPDC) service. The IPDC service providing apparatus includes a data input unit generating an IP packet and signaling information of the IP packet; a packet generation control unit determining a type of an Internet Protocol Data Group (IPDG) packet that is to be generated by encapsulating the IP packet, on the basis of characteristics of the IPDC service; an IPDG packet generation unit generating an IPDG packet according to a data type of the IP packet, and generating an IPDG packet for the signaling information of the IP packet; a transfer stream packet generation unit generating the IPDG packet as a transfer stream packet; and a transfer unit transmitting the transfer stream packet. Accordingly, it is possible to provide an IPDC service while efficiently using a bandwidth, in a Digital Audio Broadcasting (DAB) system.

40 Claims, 14 Drawing Sheets

U.S. PATENT DOCUMENTS

| | | | |
|---|---|---|---|
| 2003/0007512 A1 | 1/2003 | Tourunen et al. | |
| 2003/0100329 A1* | 5/2003 | Kwon et al. | 455/522 |
| 2004/0076194 A1* | 4/2004 | Okamoto et al. | 370/537 |
| 2004/0088642 A1 | 5/2004 | Imura et al. | |
| 2004/0125793 A1* | 7/2004 | Yi et al. | 370/352 |
| 2005/0053035 A1* | 3/2005 | Kwak et al. | 370/331 |
| 2005/0054363 A1* | 3/2005 | Marinov et al. | 455/522 |
| 2005/0090235 A1* | 4/2005 | Vermola et al. | 455/414.3 |
| 2005/0157714 A1* | 7/2005 | Shlissel et al. | 370/389 |
| 2005/0175006 A1* | 8/2005 | Miyazaki et al. | 370/389 |
| 2005/0180415 A1* | 8/2005 | Cheung et al. | 370/389 |
| 2005/0226227 A1* | 10/2005 | Kim et al. | 370/352 |
| 2006/0039358 A1* | 2/2006 | Kim | 370/389 |
| 2006/0072623 A1 | 4/2006 | Park | |
| 2006/0253600 A1* | 11/2006 | Hannuksela | 709/231 |
| 2006/0268865 A1* | 11/2006 | Yokota | 370/389 |
| 2007/0086434 A1* | 4/2007 | Venkatachalam et al. | 370/352 |
| 2007/0143858 A1* | 6/2007 | Hearty | 726/27 |
| 2007/0168534 A1* | 7/2007 | Hiltunen et al. | 709/230 |
| 2008/0199021 A1* | 8/2008 | Park | 381/81 |
| 2008/0282310 A1* | 11/2008 | Koppelaar et al. | 725/118 |
| 2008/0301314 A1* | 12/2008 | Paila et al. | 709/231 |
| 2009/0147804 A1* | 6/2009 | Wang et al. | 370/476 |
| 2009/0307564 A1* | 12/2009 | Vedantham et al. | 714/776 |

FOREIGN PATENT DOCUMENTS

| | | |
|---|---|---|
| JP | 2004533792 A | 11/2004 |
| JP | 2006109464 A | 4/2006 |
| WO | 2004/112417 A1 | 12/2004 |
| WO | 2005/041594 A1 | 5/2005 |
| WO | 2005/112312 A1 | 11/2005 |
| WO | 2008/004826 A1 | 1/2008 |

OTHER PUBLICATIONS

"Radio Broadcasting Systems; Digital Audio Broadcasting (DAB) to mobile, portable and fixed receivers", European Broadcasting Union, Final Draft ETSI EN 300 401, vol. BC, No. V1.4.1, Jan. 1, 2006, pp. 1-197.

M-J Montpetit, et al., "A Framework for Transmission of IP Datagrams over MPEG-2 Networks", IETF Standard, Internet Engineering Task Force, IETF, Nov. 1, 2005, XP015043197, pp. 1-42.

European Search Report, dated May 17, 2011, issued in Application No. 07768620.2.

Communication dated Mar. 27, 2012 issued by the Japanese Patent Office in counterpart Japanese Application No. 2009-517997.

* cited by examiner

FIG. 2

| VALUE | IPDG TYPE | NOTE |
|---|---|---|
| 000 | NORMAL TYPE | NORMAL IP/UDP/RTP PACKET |
| 001 | DAB-RTP TYPE | RTP PAYLOAD WITHOUT IP/UDP/RTP HEADER |
| 010 | COMPRESSED RTP TYPE | RTP PAYLOAD WITH COMPRESSED IP/UDP/RTP HEADER |
| 011 | COMPRESSED IP TYPE | COMPRESSED IP PACKET WITH COMPRESSED HEADER |
| 100 | DAB-IPDC SIGNALING | DAB-IPDC SIGNALING |
| 101 | RFU | |
| 110 | RFU | |
| 111 | RFU | |

FIG. 13

| USER APPLICATION DATA FIELD | | |
|---|---|---|
| SID of IPDC-PAT | SID of IPDC-CAT | SID of ESG |

METHOD AND APPARATUS FOR PROVIDING INTERNET PROTOCOL DATACASTING (IPDC) SERVICE, AND METHOD AND APPARATUS FOR PROCESSING IPDC SERVICE

CROSS-REFERENCE TO RELATED PATENT APPLICATION

This application claims priority from Korean Patent Application No. 10-2007-0030050, filed on Mar. 27, 2007, in the Korean Intellectual Property Office, and U.S. Provisional Patent Application No. 60/818,986, filed on Jul. 7, 2006, in the U.S. Patent and Trademark Office, the disclosures of which are incorporated herein in their entireties by reference.

BACKGROUND OF THE INVENTION

1. Field of the Invention

Apparatuses and method consistent with the present invention relate to a method and apparatus for providing an Internet Protocol Datacasting (IPDC) service, and more particularly, to a method and apparatus for providing an IPDC service and a method and apparatus for processing the IPDC service, in a digital audio broadcast and a digital multimedia broadcast.

2. Description of the Related Art

Digital Audio Broadcasting (DAB) which provides a variety of additional data services, such as a weather service, a traffic service, an entertainment service, and an image service, as well as CD-level high-quality audio services, using a latest audio encoding method having a high compression rate is being serviced. Recently, Digital Multimedia Broadcasting (DMB) which is an improved type of the DMB is being serviced.

Meanwhile, IPDC is a broadcast technique for transferring digital content, such as games, video and audio files, and computer programs, to a plurality of users through a broadcast network. Since IPDC is a broadcast or a one-to-many distribution technology, the IPDC can efficiently transmit IP-based digital contents with high-cost efficiency to many customers.

With development of the Digital Video Broadcasting-Handhelds (DVB-H) standard, IPDC-based services are being provided, but the DAB (ETSI EN 300 401) has no standardized IPDC mechanism.

In the case of a DVB-Terrestrial/Handhelds (DVB-T/H), an MPEG-2 TS is a lower layer transport mechanism, but in the DAB sub-channel of a Main Service Channel (MSC) is a lower layer transport mechanism. When an IP datagram is broadcast using a DVB-H protocol stack through a DAB broadcast system, bandwidth efficiency and processing may deteriorate due to overhead in Multi-Protocol Encapsulation (MPE) and MPEG-2 TS packetization.

SUMMARY OF THE INVENTION

The present invention provides a method and apparatus for efficiently providing an IPDC service using a new packetization method in a DAB or DMB system.

The present invention also provides a method and apparatus for processing an IPDC service which is provided using a new packetization method.

According to an aspect of the present invention, there is provided an IPDC service providing method including: generating at least one IP packet and signaling information of the at least one IP packet; determining a type of at least one Internet Protocol Data Group (IPDG) packet that is to be generated by encapsulating the at least one IP packet, on the basis of characteristics of the IPDC service; generating the at least one IPDG packet according to the type of the at least one IPDG packet, and generating an IPDG packet regarding the signaling information of the at least one IP packet; and generating the at least one IPDG packet according to the type of the at least one IPDG packet and the IPDG packet regarding the signaling information of the at least one IP packet, as at least one transfer stream packet; and transmitting the at least one transfer stream packet.

According to another aspect of the present invention, there is provided an IPDC service providing apparatus including: a data input unit generating at least one Internet Protocol (IP) packet and signaling information of the at least one IP packet; a packet generation control unit determining a type of at least one IPDG packet that is to be generated by encapsulating the at least one IP packet, on the basis of characteristics of the IPDC service; an IPDG packet generation unit generating the at least one IPDG packet according to the type of the at least one IPDG packet, and generating an IPDG packet regarding the signaling information of the at least one IP packet; a transfer stream packet generation unit generating the at least one IPDG packet according to the type of the at least one IPDG packet and the IPDG packet regarding the signaling information of the at least one IP packet, as at least one transfer stream packet; and a transfer unit transmitting the at least one transfer stream packet.

According to another aspect of the present invention, there is provided an IPDC service processing method including: receiving at least one transfer stream packet including at least one IPDG packet generated by encapsulating at least one IP packet; processing the at least one transfer stream packet and generating the at least one IPDG packet; extracting the at least one IP packet or signaling information of the at least one IP packet, from the at least one IPDG packet, using type information indicating an IPDG packet type which is included in a header of the at least one IPDG packet and determined on the basis of characteristics of the IPDC service; and processing the at least one IP packet and the signaling information of the at least one IP packet.

According to another aspect of the present invention, there is provided an IPDC service processing apparatus including: a receiver receiving at least one transfer stream packet including at least one IPDG packet generated by encapsulating at least one IP packet; a transfer stream packet processing unit processing the at least one transfer stream packet and generating the at least one IPDG packet; an IPDG packet processing unit extracting the at least one Internet Protocol (IP) packet or signaling information of the at least one IP packet, from the at least one IPDG packet, using type information indicating an IPDG packet type determined on the basis of characteristics of an IPDC service included in a header of the at least one IPDG packet; and a data processing unit processing the at least one IP packet or the signaling information of the at least one IP packet.

BRIEF DESCRIPTION OF THE DRAWINGS

The above and other features of the present invention will become more apparent by describing in detail exemplary embodiments thereof with reference to the attached drawings in which:

FIG. 2 is a list of the types of an Internet Protocol Data Group (IPDG) Packet for an IPDC service, according to an exemplary embodiment of the present invention;

FIG. 13 is a view illustrating a user application data field for IPDC service signaling through a DAB system, according to an exemplary embodiment of the present invention;

DETAILED DESCRIPTION OF THE INVENTION

Hereinafter, exemplary embodiments of the present invention will be described in detail with reference to the appended drawings.

Figure 1:
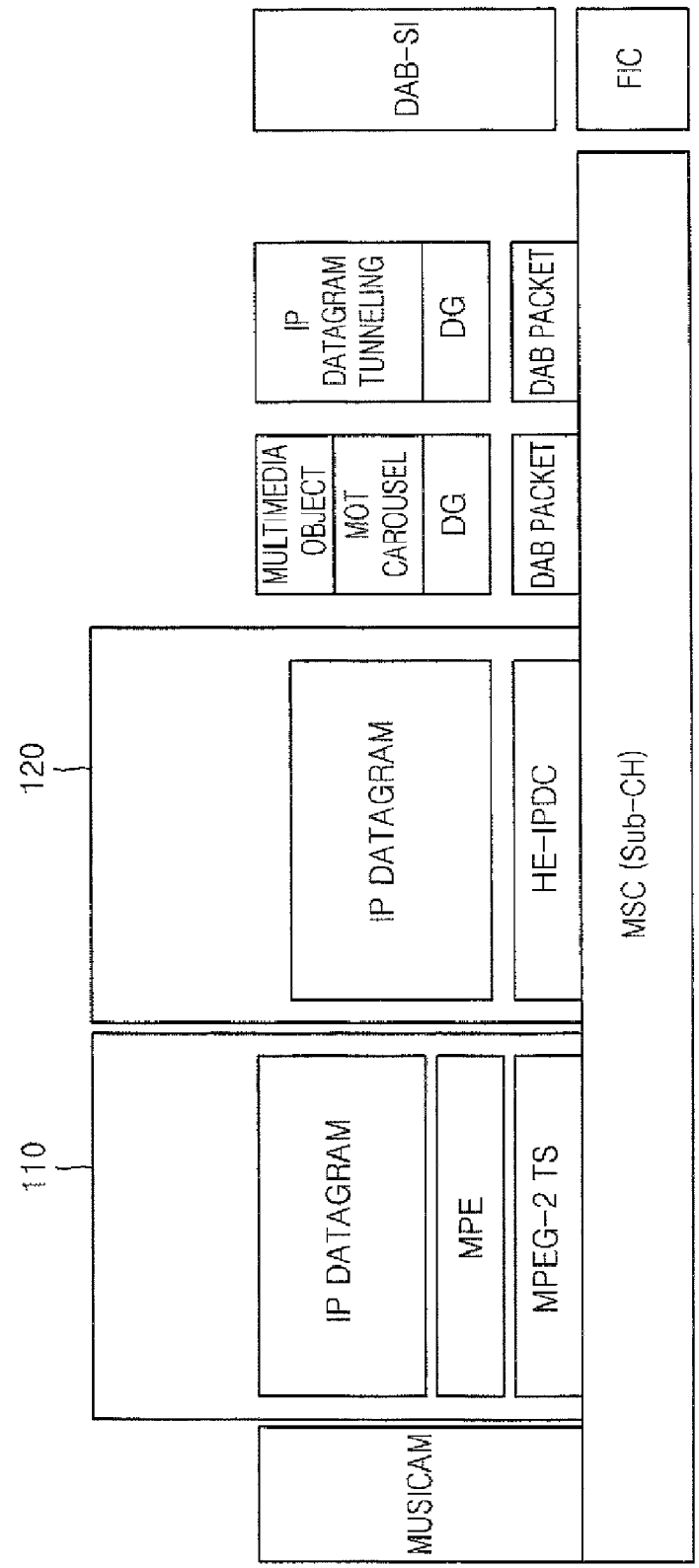
FIG. 1 is a view for explaining protocol stacks of a DAB service, according to an exemplary embodiment of the present invention.

FIG. 1 is a view for explaining a Digital Audio Broadcasting (DAB) service according to an exemplary embodiment of the present invention.

Referring to FIG. 1, it is assumed that a Digital Video Broadcasting-Handheld (DVB-H) protocol stack 110 is used when an IPDC) service is provided through a Digital Audio Broadcasting (DAB) or Digital Multimedia Broadcasting (DMB) system. If the DVB-H protocol stack 110 is used, a bandwidth cannot be efficiently used to provide the IPDC service, as described above as a program of a related art technique.

In the DAB system, a protocol stack 120 is used to efficiently provide the IPDC service. As illustrated in the protocol stack 120, IP data is processed according to a highly-efficient-IPDC protocol of the IPDC service, and transmitted through a Main Service Channel (MSC) of DAB. FIG. 1 shows a case where a DAB audio broadcast through Masking Pattern Adapted Universal Sub-band Integrated Coding And Multiplexing (MUSICAM) of a MSC and multimedia objects are transmitted, and IP packets can be transmitted by IP tunneling through the MSC, wherein the MUSICAM is a highly efficient audio coding process which can compress digital audio signals to one of a number of possible encoding options in the range 8 kbit/s to 384 kbit/s, at a sampling rate of 48 kHz. Also, DAB service information is transmitted through a Fast Information Channel (FIC).

FIG. 2 is a list of the types of an IPDG Packet for the IPDC service, according to an exemplary embodiment of the present invention.

Figure 3:
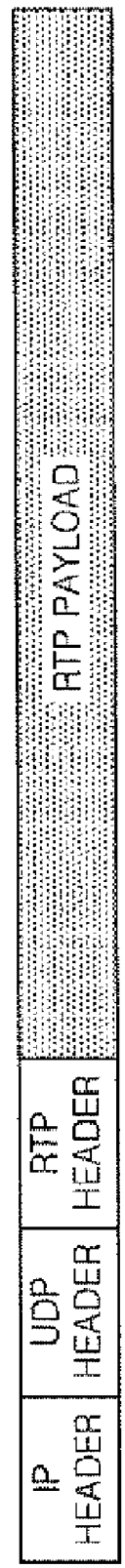
FIG. 3 is a view illustrating the structure of a normal IP packet.

FIG. 3 is a view illustrating the structure of a normal IP packet.

In the current exemplary embodiment, an IP packet or signaling information of the IP packet is encapsulated into an IPDG packet having a variable length. A normal IP packet, as illustrated in FIG. 3, includes an IP header, a User Datagram Protocol (UDP) header, a Real-time Transport Protocol (RTP) header, and an RTP payload containing RTP data. According to an exemplary embodiment of the present invention, a normal IPDG packet for transmitting the normal IP packet as illustrated in FIG. 3 through a DAB or DMB network is generated. Also, according to an exemplary embodiment of the present invention, in order to reduce a bandwidth when a normal IPDG packet is transmitted through a broadcast network, a different type of IPDG packet including only a part of IP packet data including an IP/UDP/RTP header and an RTP payload, or including a header of a compressed IP packet can be defined and transmitted.

According to an exemplary embodiment of the present invention, the type of IPDG packet is determined according to characteristics of an IPDC service. The IPDG packet includes type information indicating a type of the IPDG packet. The characteristics of the IPDC service include at least one among a bandwidth assigned to provide the IPDC service, a coverage range of the IPDC service, and a broadcast receiver type to which the IPDC service can be provided.

The bandwidth assigned to provide the IPDC service may be used to provide a single IPDC service or a plurality of IPDC services. The coverage range of the IPDC service can vary according to whether the purpose of the IPDC service is to_simply receive data and provide it to users, or to allow users to interactively use IP packets included in the IPDC service, such as communicating with other servers using IP packets included in the IPDC service. Also, the type of IPDG packet can be determined in consideration of a function of a broadcast receiver terminal which will receive the IPDC service, for example, in consideration of whether or not a broadcast receiver terminal which will receive the IPDC service can process the IP packet.

Referring to FIG. 2, the types of the IPDG packet include a normal type (type information: "000"), a DAB-RTP type (type information: "001"), a compressed RTP type (type information: "010"), and a compressed IP type (type information: "011"). The normal type is a packet type for transmitting an IP packet having a normal IP/UDP/RTP header. The DAB-RTP type is a packet type for transmitting an RTP payload having no IP/UDP/RTP header. The compressed RTP type is a packet type for transmitting an RTP payload having a compressed IP/UDP/RTP header. The compressed IP type is a packet type for transmitting a compressed IP packet subjected to header compression.

Also, another type of the IPDG packet includes a DAB-IPDC signaling type (type information: "100") for transmitting signaling information of an IP packet. The signaling information of the IP packet includes setting information, etc., for system initialization of a device which receives an IPDC service. The DAB-IPDC signaling type will be described later with reference to Tables 1 and 2.

Figure 4:
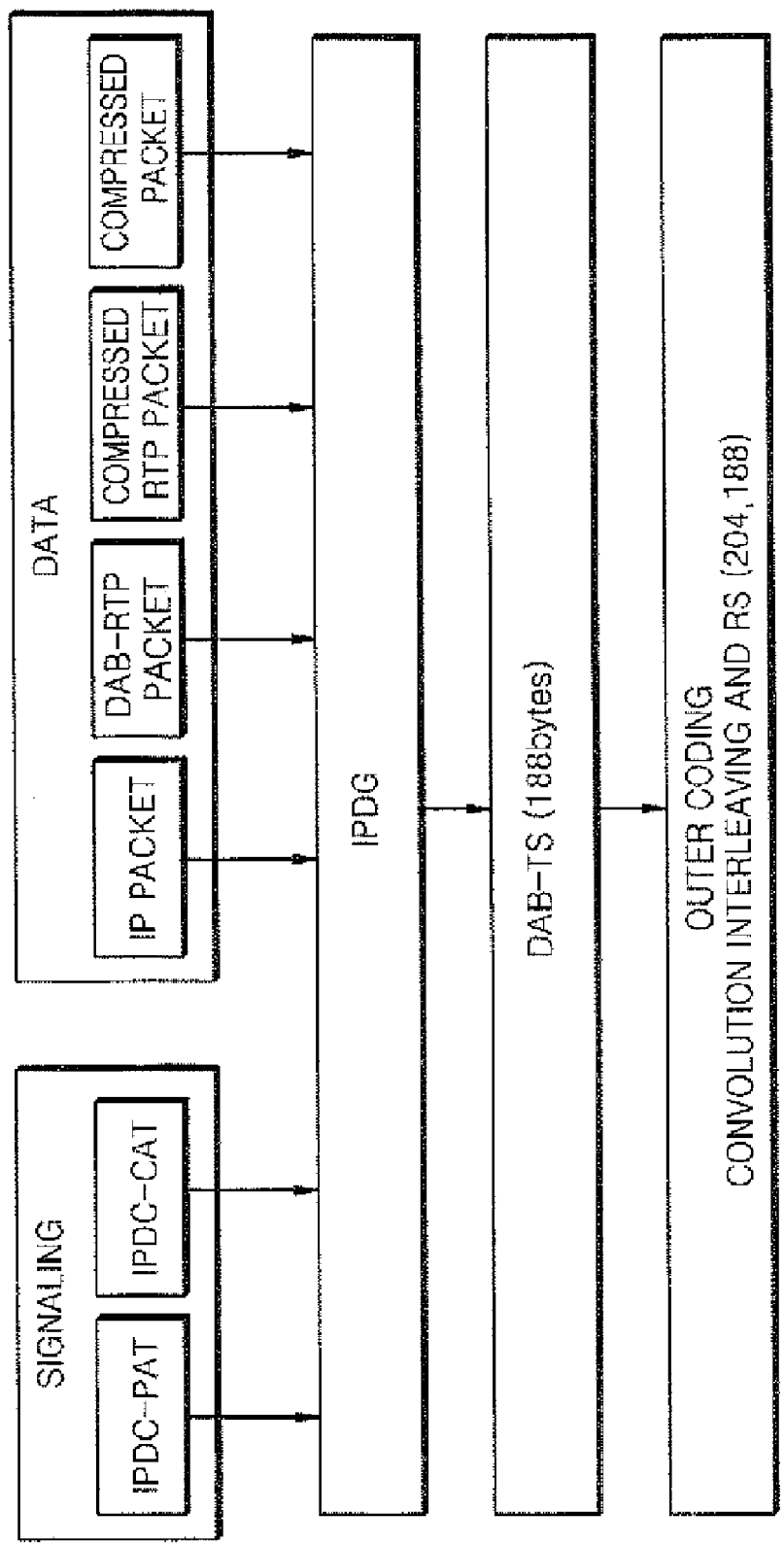
FIG. 4 is a view illustrating a protocol stack of a highly-efficient IPDC service, according to an exemplary embodiment of the present invention.

FIG. 4 is a view illustrating a protocol stack of a highly efficient IPDC service, according to an exemplary embodiment of the present invention.

As illustrated in FIG. 4, in order to provide the IPDC service, an IPDG packet is generated by encapsulating signaling information and IP packet data into an IPDG. Then, the IPDG packet is packetized into a transfer stream packet (also referred to as a DAB-TS packet), and the transfer stream packet is encoded by an outer coder and then transmitted. The size of the transfer stream packet is 188 bytes. The outer coder performs convolution interleaving and RS coding on the transfer stream packet. Thus, bits for error correction coding (ECC) are added to the 188 bytes of the transfer stream packet, so that the size of the transfer stream packet is a total of 204 bytes.

Figure 5:
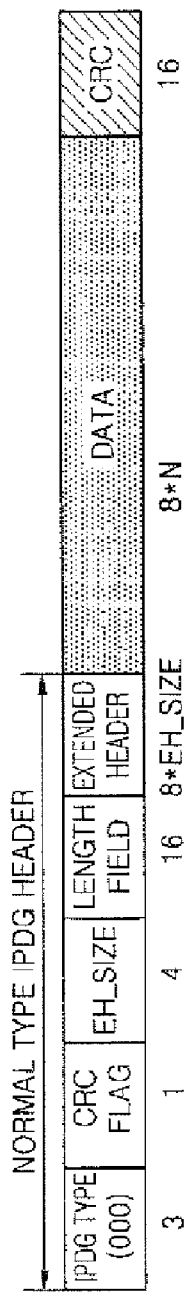
FIG. 5 is a view illustrating the structure of an IPDG packet according to an exemplary embodiment of the present invention.

FIG. 5 is a view illustrating the structure of an IPDG packet according to an exemplary embodiment of the present invention.

The IPDG packet basically includes an IPDG type field indicating an IPDG type, a header field which is configured according to the IPDG type, an extension field configured according to the IPDG type, and a payload in which data according to the IPDG type is included.

A normal type IPDG packet will be described with reference to FIG. 5, below.

3 bits of an IPDG type field include information regarding the type of payload included in the IPDG packet. In the case of the normal type IPDG packet, an IPDG type value included in the IPDG type field can be set to "000". 1 bit of a CRC flag field represents whether a CRC flag is used. 4 bits of an EH_SIZ field represent the size of a header which is extended in units of bytes. 16 bits of a length field represent the length of data which is represented in units of bytes. In the current exemplary embodiment, an extended header field EH_SIZE*8 represents an extended header of the IPDG packet. In the case of the normal type IPDG packet, an IP/UDP/RTP header is included in the extended header field. A data field DATA (variable) represents a payload of the IPDG packet. 16 bits of a CRC field represent a CRC value of the IPDG packet part which precedes the CRC field. Meanwhile, a single normal IP packet or a plurality of successive IP packets can be encapsulated using the normal type IPDG header.

Figure 6:
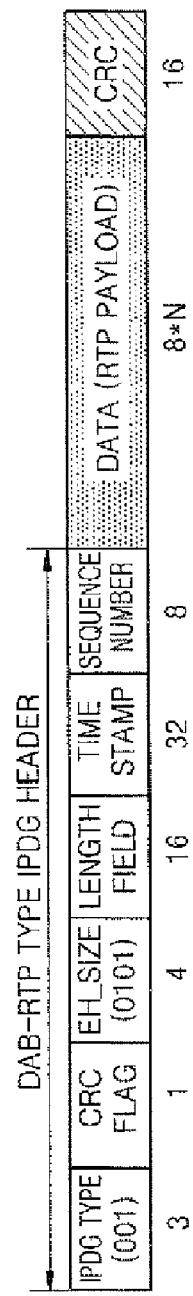
FIG. 6 is a view illustrating the structure of a Digital Audio Broadcast-Real-time Transport Protocol (DAB-RTP) type IPDG packet according to an exemplary embodiment of the present invention.

FIG. 6 is a view illustrating the structure of a DAB-RTP type IPDG packet according to an exemplary embodiment of the present invention.

As illustrated in FIG. 6, in the DAB-RTP type IPDG packet, 3 bits "001" of an IPDG type value represent that DAB-RTP type data is included in a payload. A time stamp of a time stamp field (32 bits) corresponds to a time stamp of an RTP header of an original IPDG packet. Also, a sequence number of a sequence number field (8 bits) corresponds to a sequence number of the RTP header of the original RTP packet. The time stamp field and the sequence number field correspond to the extended header field illustrated in FIG. 5.

The DAB-RTP type IPDG packet is obtained by encapsulating only an RTP payload, in order to efficiently use a bandwidth of a DAB-based IPDC service. The DAB-RTP type IPDG packet transmits RTP data and information required to process an RTP packet. Here, the information required to process the RTP packet corresponds to the time stamp and sequence number contained in the RTP header of the IPDG packet.

The time stamp is used for synchronization of media data included in the RTP payload. The sequence number is used to check fragmentation of the RTP payload having the time stamp. The time stamp and sequence number become a criterion for synchronization for the RTP payload.

When a DAB-IPDC broadcast receiver has no TCP/IP socket, that is, when a DAB-IPDC broadcast receiver cannot process IP packets as it does not have a function of parsing IP/UDP headers, the DAB-IPDC broadcast receiver cannot process IPDG packets including normal IP packets. However, the DAB-RTP type IPDG packet according to the current exemplary embodiment can be processed by a DAB-IPDC broadcast receiver without a TCP/IP socket.

The other header information, such as an IP header, a UDP header, and an RTP header, can be generated by using a variety of devices. Essential information includes an IP address, a port number, a time stamp, and a sequence number. The essential information can be provided by a different path, for example, by a Fast Information Channel (FIC) or a Session Description Protocol (SDP).

Figure 7:
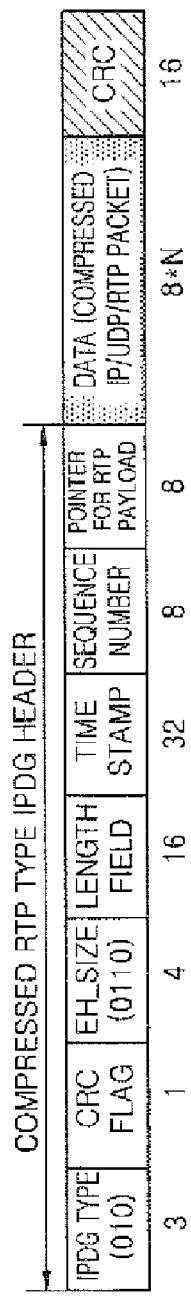
FIG. 7 is a view illustrating the structure of a compressed Real-time Transport Protocol (RTP) type IPDG packet according to an exemplary embodiment of the present invention.

FIG. 7 is a view illustrating the structure of a compressed RTP type IPDG packet according to an exemplary embodiment of the present invention.

In FIG. 7, 3 bits "010" of an IPDG type value indicate that compressed RTP type data is included in a payload. If a broadcast receiver includes a high-performance CPU based on an IP terminal, the broadcast receiver can use a compressed RTP type packet having a compressed IP/UDP/RTP header, as illustrated in FIG. 7.

In FIG. 7, a time stamp of a time stamp field (32 bits) corresponds to a time stamp of an RTP header of the original RTP packet, and a sequence number of a sequence number field (8 bits) corresponds to a sequence number of the RTP header of the original RTP packet. An RTP payload pointer value of a pointer field (8 bits) indicates the location of a start byte of an RTP payload which follows a compressed IP/UDP/RTP header in the data field.

When a broadcast receiver has no TCP/IP socket, the broadcast receiver cannot process an IP/UDP header including a compressed IP/UDP/RTP header. However, if a time stamp and a sequence number are included in a specific field which precedes the compressed IP/UDP/RTP header, the broadcast receiver can process the corresponding RTP payload even though the broadcast receiver cannot decompress the compressed IP/UDP/RTP header.

In the case of the broadcast receiver without the TCP/IP socket, an RTP payload pointer field as well as a time stamp field and a sequence number field are used. Since a time stamp and sequence number provide an RTP payload pointer to a broadcast receiver, the broadcast receiver can process RTP type IPDG data having a compressed IP/UDP/RTP header even when the broadcast receiver has no TCP/IP socket.

Figure 8:
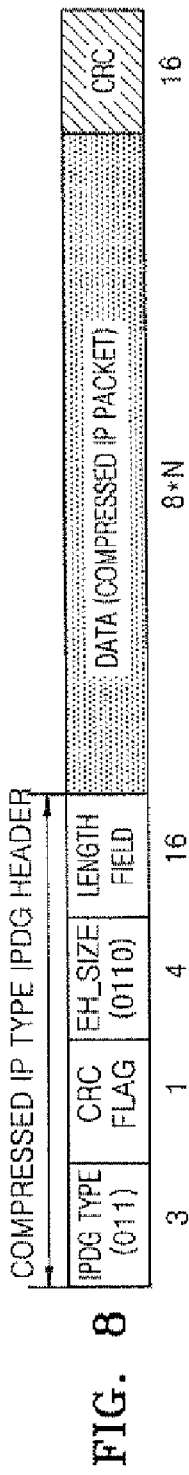
FIG. 8 is a view illustrating the structure of a compressed IP type IPDG packet according to an exemplary embodiment of the present invention.

FIG. 8 is a view illustrating the structure of a compressed IP type IPDG packet according to an exemplary embodiment of the present invention.

In FIG. 8, 3 bits "011" of an IPDG type value represent that compressed data is included in a payload of the IPDG packet. When a broadcast receiver based on an IP terminal includes a high-performance CPU so that the broadcast receiver can decompress a compressed header of an IP packet, as illustrated in FIG. 8, a compressed IP type IPDG packet obtained by compressing a header of an IP packet can be used. Although the compressed IP type IPDG packet requires a high-performance broadcast receiver, the compressed IP type IPDG packet can provide an IPDC service using a narrowest bandwidth compared to bandwidths required by different IPDG packet types.

In the case of the compression type IPDG packet, compression type IPDG data having a compressed IP/UDP/RTP header cannot be processed by a broadcast receiver without a TCP/IP socket function. Accordingly, the compression IP type IPDG packet will be used selectively in specific cases.

Figure 9:
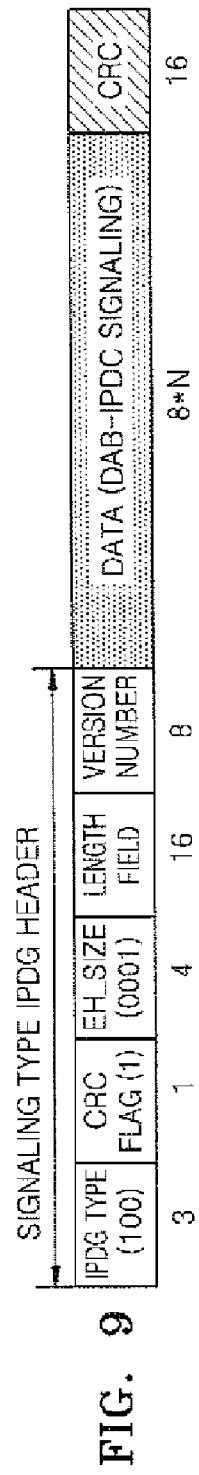
FIG. 9 is a view illustrating the structure of a signaling type IPDG packet according to an exemplary embodiment of the present invention.

FIG. 9 is a view illustrating the structure of a signaling type IPDG packet according to an exemplary embodiment of the present invention.

In FIG. 9, 3 bits "100" of an IPDG type value represent that signaling type data is included in a payload of the IPDG packet. Signaling data for a DAB-IPDC service is encapsulated into a signaling type IPDG packet, as illustrated in FIG. 9.

In FIG. 9, 8 bits of a version number field include a value which represents a current version of an IPDC service.

By using the version number field, it is possible to represent whether the current version of the IPDC service changes. The IPDC service includes a primary IPDC service and a complete IPDC service according to an exemplary embodiment of the present invention. The primary IPDC service is a primary service of the IPDC service, and is defined by an IPDC-PAT (Internet Protocol DataCasting-Primary Service Announcement Table). The complete IPDC service is the remaining service which excludes the primary IPDC service from the IPDC service, and is defined by an IPDC-CAT (Internet Protocol DataCasting-Complete service Announcement Table). The two tables IPDC-PAT and IPDC-CAT are transmitted according to a signaling type of an IPDG packet.

TABLE 1

IPDC-PAT

| Syntax | NO. of bits | Restrictions |
|---|---|---|
| IPDC-PAT( ) | | |
| { | | |
| DAB_Bearer_Descriptor( ) | N | |
| SDP_Descriptor( ) | M | |
| CRC32 | 32 | |
| } | | |

It describes how the IP packet and the SID are related and this relationship is reflected in the level of a DAB-IP bearer. "SDP_Descriptor( )" includes compressed SDP information of a primary IPDC service. For high-speed access, "SDP_Descriptor( )" is included in the IDPC-PAT.

TABLE 2

IPDC-CAT

| Syntax | NO. of bits | Restrictions |
|---|---|---|
| IPDC-PAT( ) ; | | |
| { | | |
| As unit of Service | L | |
| { | | |
| DAB_Bearer_Descriptor( ) | N | |
| SDP_Descriptor( ) | M | |
| } | | |
| CRC32 | 32 | |
| } | | |

In Table 2, the use of "SDP_Descriptor( )" depends on the validity of an Electronic Service Guide (ESG) in an IPDC service.

Figure 10:
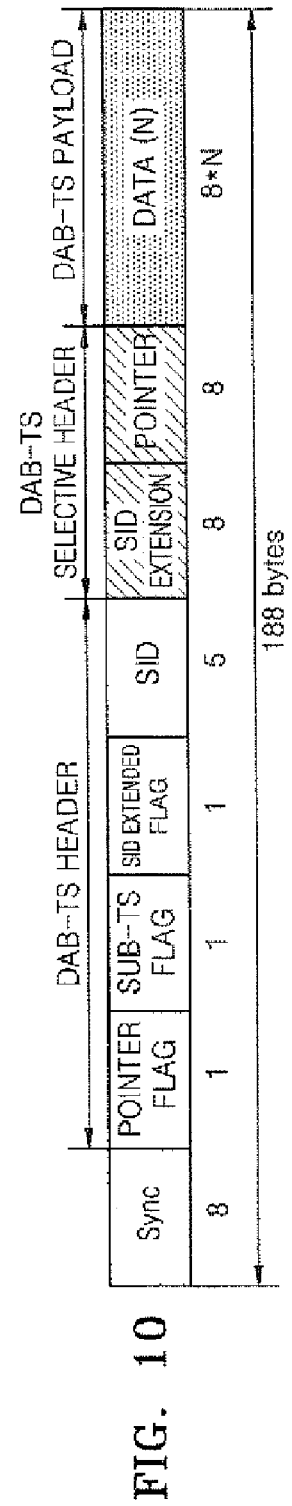
FIG. 10 is a view illustrating the structure of a transfer stream packet into which an IPDG packet is packetized, according to an exemplary embodiment of the present invention.

FIG. 10 is a view illustrating the structure of a transfer stream packet into which an IPDG packet is packetized, according to an exemplary embodiment of the present invention.

An IPDG packet is subjected to time-division multiplexing, thereby being packetized into a transfer stream packet. The size of the transfer stream packet is 188 bytes so that a related art error correction method such as DVB-forward error correction (FEC) of a lower layer can be applied to the transfer stream packet. A first byte of the transfer stream packet is a synchronization byte having a value 0x47.

A header of the transfer stream packet includes a pointer flag, a sub-TS flag, an SID extended flag, and an SID extended field. 1 bit of the pointer flag represents whether a pointer field is used. 1 bit of the sub-TS flag represents whether a sub-TS header is used following a start byte of data represented by a pointer value. The sub-TS flag means the configuration including the transfer stream packet header and a next IPDG packet when two or more IPDG packets are included in the transfer stream packet and a transfer stream packet header for the next IPDG packet exists in the transfer stream packet.

1 bit of the SID extended flag represents whether 8 bits of the SID extended field are used. The SID extended field may be an empty field which can be used later. However, the SID extended field is not used for a packet for IPDC signaling.

The SID represents a service ID assigned to the IPDG packet which provides an IPDC service.

The same SID can be assigned to all IPDG packets which provide the same service, or different SIDs can be respectively assigned to respective IPDG packets. The operation will be described below with reference to FIGS. 11A and 11B.

8 bits of a pointer field indicate the location of bytes of an encapsulated next IPDG packet.

Figure 11A:
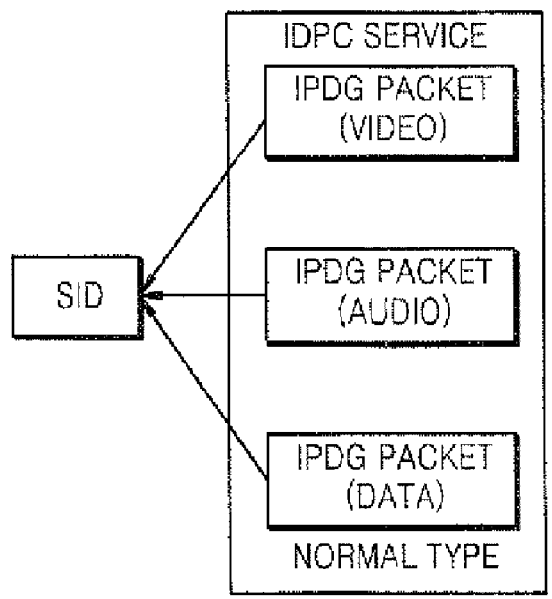
FIGS. 11A and 11B are views for explaining a method of assigning Service IDentifiers (SIDs) to IPDG packets, according to an exemplary embodiment of the present invention.
Figure 11B:
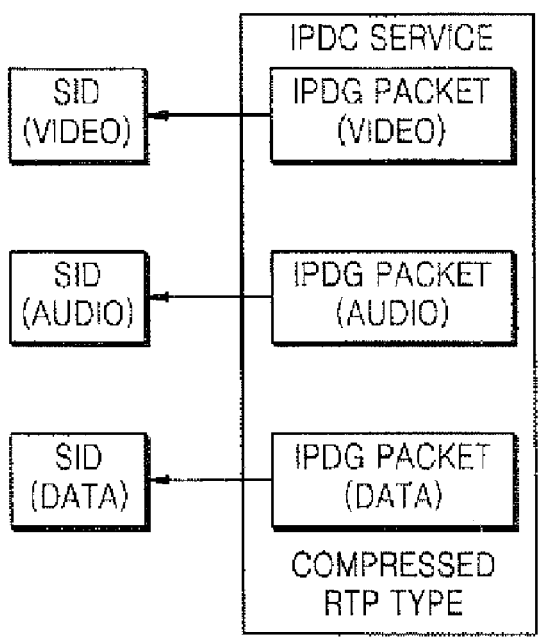

FIGS. 11A and 11B are views for explaining a method of assigning Service IDentifiers (SIDs) to IPDC packets, according to an exemplary embodiment of the present invention.

As illustrated in FIG. 11A, an IPDC service has a plurality of media packets (audio and video IP packets), each of which has its own SID. In FIG. 11A, all IPDG packets for transmitting media data have the same SID.

In the case of normal type IPDG packets, it is recommended that the same SID is assigned to IPDG packets transmitting different media data. An IP header of each IP packet includes a length field to identify the IP packet, and an RTP header of each IP packet includes a media data type field to identify a media data type of the IP packet.

However, if the IPDG packets are not normal type IPDG packets, different SIDs are respectively assigned to respective IPDG packets of different media data. The reason for this is because an IPDG packet, which is not a normal type, is transmitted in the state that its IP header is compressed or omitted.

FIGS. 12A through 12F are views illustrating a variety of structures of a transfer stream packet into which at least one IPDG packet is packetized, according to an exemplary embodiment of the present invention.

Figure 12A:
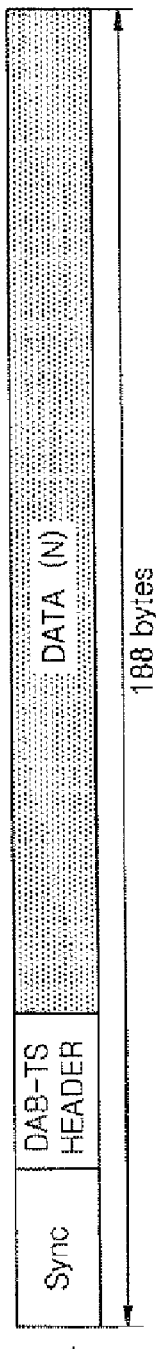
FIGS. 12A through 12F are views illustrating a variety of structures of a transfer stream packet into which at least one IPDG packet is packetized, according to an exemplary embodiment of the present invention.

FIG. 12A illustrates a transfer frame packet into which an IPDG packet is packetized. Referring to FIG. 12A, the size of the transfer frame packet is 188 bytes, and includes a synchronization field Sync, a DAB-TS header, and data.

The IPDG packet has a variable length, and is divided and packetized into a plurality of transfer frame packets, wherein the size of each transfer frame packet is 188 bytes.

Figure 12B:
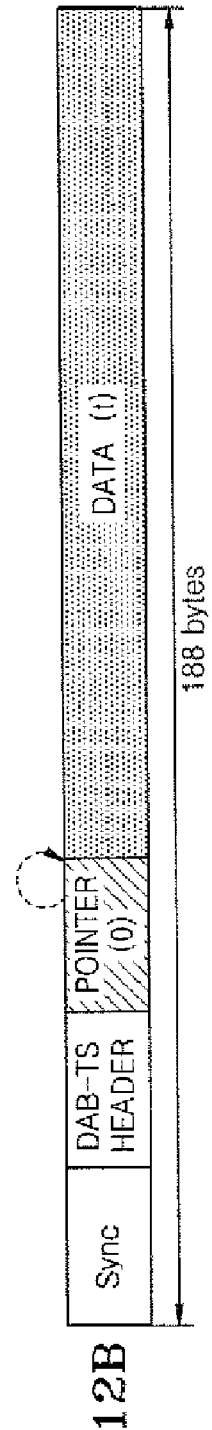

When a first segment of the IPDG packet is packetized into a DAB-TS, as illustrated in FIG. 12B, since a pointer value of a pointer field located in a selective header of the transfer stream packet as illustrated in FIG. 11 is "0", the first segment of the IPDG packet is loaded following the pointer field.

Figure 12C:
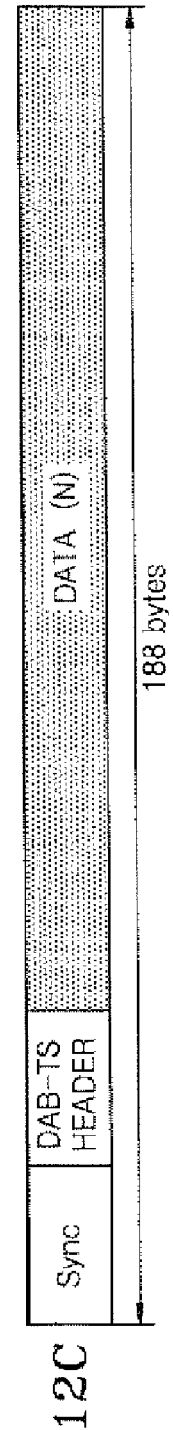

When an intermediate segment of the IPDG packet is packetized into a transfer stream packet, as illustrated in FIG. 12C, a pointer flag value included in the DAB-TS header of the transfer stream packet is "0", which means that no pointer field exists and IPDG packet data is loaded following the DAB-TS header.

Figure 12D:
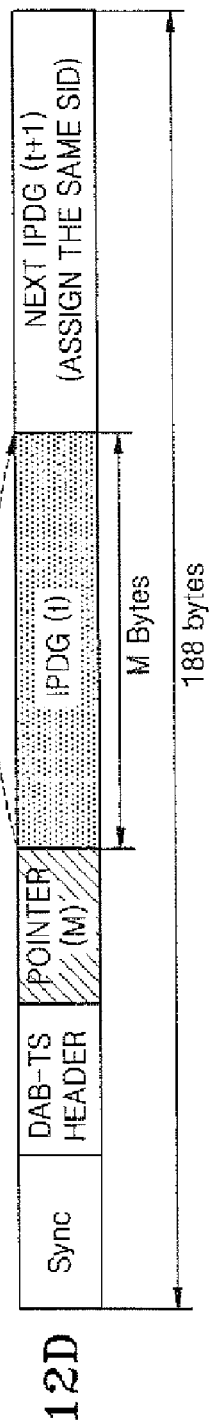
Figure 12E:
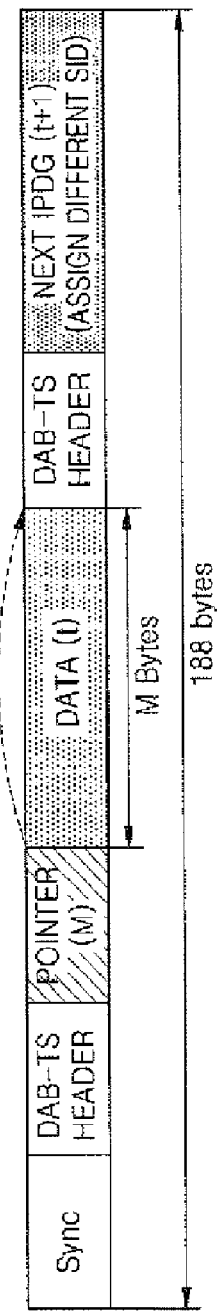
Figure 12F:
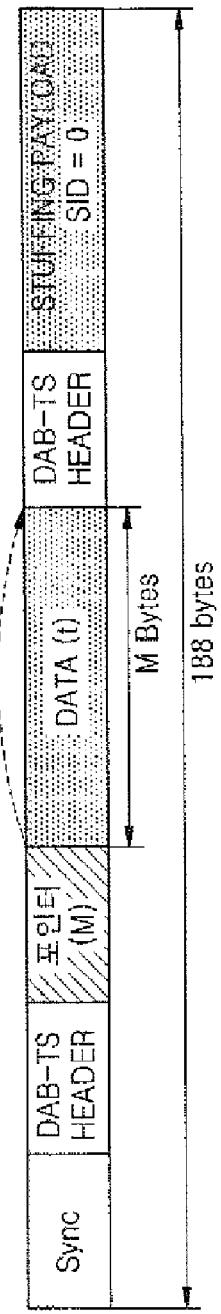

When a final segment of the IPDG packet is packetized into a transfer stream packet, as illustrated in FIGS. 12D through 12F, the transfer stream packet can be of three types. In FIGS. 12D through 12F, IPDG(t) represents a current IPDG packet and IPDG(t+1) represents a next IPDG packet.

First, as illustrated in FIG. 12D, if a next IPDG packet IPDG(t+1) to which the same SID as that assigned to the current IPDG packet IPDG(t) is assigned is added to the current IPDG packet IPDG(t), a pointer flag of a header of the transfer stream packet is set to "1", and M bytes are assigned to a pointer field of the header. Accordingly, the M bytes of the pointer field represent that the next IPDG packet IPDG(t+1) to which the same SID is assigned is loaded following the M bytes of the pointer field.

Second, as illustrated in FIG. 12E, if a next IPDG packet IPDG(t+1) to which an SID different from that assigned to a current IPDG packet IPDG(t) is assigned is added to the current IPDG packet IPDG(t), a pointer flag is set to "1", a sub-TS flag is set to "1", and M bytes are assigned to a pointer field, in a header of the corresponding transfer stream packet.

In a header of a sub-TS, that is, in a DAB-TS header before the next IPDG packet IPDG(t+1), a pointer flag is set to "0", a sub-TS flag is set to "0", and a new SID is assigned to an SID field.

Third, as illustrated in FIG. 12F, if no next IPDG packet exists or if a new transfer frame packet is used to improve error resistance, a pointer flag is set to "1", a sub-TS flag is set to "1", and M bytes are assigned to a pointer field, in a header of the corresponding transfer frame packet. In a header of a sub-TS of the transfer frame packet, a pointer flag is set to "0", a sub-TS flag is set to "0", and "0" is assigned to an SID field. An SID value included in the header of the sub-TS is "0", which indicates that stuffing data is included in the sub-TS.

FIG. 13 is a view illustrating a user application data field for IPDC service signaling through a DAB system, according to an exemplary embodiment of the present invention.

In order to provide an IPDC service through a broadcast network, it is necessary to define detailed information of the IPDC service and announce the IPDC service. In order to represent that an IPDG service is provided through a DAB data channel, a user application type FIG 0/13 can be used. In the DAB system, an IPDC service can include a primary IPDC service that is to be processed in priority order and a complete IPDC service. The user application data field transfers three 1-byte fields.

The first byte of the 1-byte fields transfers a primary Ipdc-Sid, the second byte of the 1-byte fields transfers a complete IpdcSid, and the third byte of the 1-byte fields transfers Esg-Sid. A broadcast receiver can ignore user application data following EsgSid. If an SID of ESG is "0", IPDC-CAT has the "SDP_Descriptor" of each IPDC service.

The primary IPDC service can be accessed by a broadcast receiver, in the following way. If a supply voltage is applied to the broadcast receiver and booting and RF tuning are complete, FIC is processed and SIDs of IPDC-PAT and IPDC-CAT are found. Then, the broadcast receiver processes IPDC-PAT corresponding to the SID. After processing the IPDC-PAT, the broadcast receiver processes SDP information from the "SDP_Descriptor". Then, the broadcast receiver processes a transfer stream packet DAB-TS of an SID corresponding to "DAB_Bearer_Descriptor". Finally, the broadcast receiver processes each media IP packet by the corresponding DAB-IPDC application.

The complete IPDC service can be accessed by a broadcast receiver, in the following way.

The broadcast receiver processes IPDC-CAT corresponding to an SID of IPDC-CAT. After processing the IPDC-CAT, if "SDP_Descriptor" is valid, the broadcast receiver processes SDP information from the "SDP_Descriptor". Then, the broadcast receiver processes a transfer stream packet of an SID corresponding to "DAB_Bearer_Descriptor". Finally, the broadcast receiver processes each media IP packet of an IPDG according to a user's selection.

If an SID of ESG (or the "SDP_Descriptor" of the IPDC-CAT) is not valid, the broadcast receiver processes a DAB-TS of an SID corresponding to the "DAB_Bearer_Descriptor". Then, the broadcast receiver processes a transfer stream packet corresponding to ESG (Electronic Service Guide). After processing the IP packet by using FLUTE (File Delivery over Unidirectional Transport), the broadcast receiver processes a DAB-TS corresponding to ESG, and processes the ESG by using an ESG application. Thereafter, the user can select an IPDC service in the ESG. After the IPDC service is selected by the user, the broadcast receiver processes each media IP packet of the IPDG. An IPDC service signaling method through a DAB system can be implemented by different methods other than the methods as described above.

Figure 14:
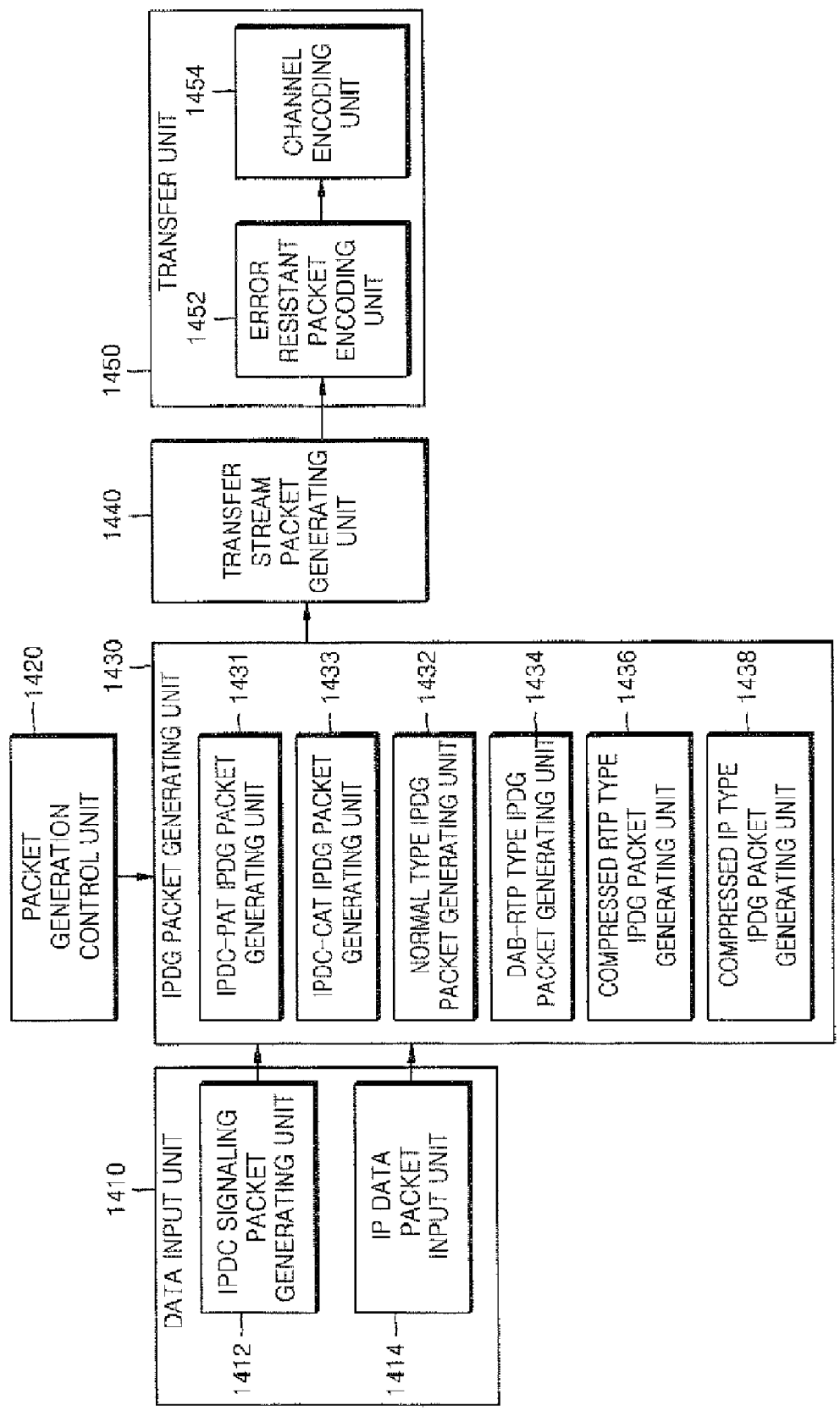
FIG. 14 is a block diagram of an IPDC service providing apparatus according to an exemplary embodiment of the present invention.

FIG. 14 is a block diagram of an IPDC service providing apparatus according to an exemplary embodiment of the present invention. The IPDC service providing apparatus, which provides an IPDC service through a broadcast network, includes a data input unit 1410, a packet generating controller 1420, an IPDG packet generator 1430, a transfer stream packet generating unit 1440, and a transfer unit 1450.

The data input unit 1410 generates an IP packet and signaling information of the IP packet. The data input unit 1410 can include an IPDC signaling packet generator 1412 and an IP data packet input unit 1414. The IPDC data packet input unit 1414 receives the IP packet and transfers the IP packet to the IPDG packet generating unit 1430. The IPDC signaling packet generator 1412 transfers a packet including the signaling information of the IP packet to the IPDG packet generating unit 1430.

The packet generating controller 1420 encapsulates the IP packet on the basis of the characteristics of an IPDC service, to generate an IPDG packet, and determines the type of IPDG packet. The characteristics of the IPDC service include at least one service characteristic, such as a bandwidth assigned to provide the IPDC service, a coverage range of the IPDC service, a broadcast receiver type to which the IPDC service will be provided, etc. The packet generating controller 1420 can determine the type of IPDG packet on the basis of at least one among the bandwidth assigned to provide the IPDC service, the coverage range of the IPDC service, and the broadcast receiver type to which the IPDC service will be provided. The packet control generating unit 1420, as described above with reference to FIG. 2, generates an IPDG packet corresponding to a type among a normal type, a DAB-RTP type, a compression RTP type, and a compression IP type. The normal type is used to transmit a normal IP packet having IP, UDP and RTP headers. The DAB-RTP type is used to transmit RTP data and information required to process an RTP packet. The compression RTP type is used to transmit information required to process an RTP packet, compressed IP, UDP, and RTP headers, and RTP data. The information required to process the RTP packet is stored in an RTP header of the IP packet, and includes a time stamp and a sequence number. The compressed IP type is used to transmit compressed IP, UDP, and RTP headers and RTP data.

A compressed RTP type of an IPDG packet includes a pointer field for representing the location of an RTP payload so that a broadcast receiver which cannot process IP packets can access the RTP payload.

The packet control generating unit 1420 determines the type of IPDG packet as the DAB-RTP type, for an IPDC service which provides only RTP payload data. Also, the packet control generating unit 1420 determines the type of IPDG packet as the compression RTP type, for an IPDC service which requires header information of an IP packet. Also, the packet control generating unit 1420 determines the type of IPDG packet as the compressed IP type, when the IPDG packet is transmitted to a broadcast receiver for receiving an IPDC service which can process a header of a compressed IP packet while reducing a bandwidth compared to the normal type, the DAB-RTP type, or the compression RTP type.

The IPDG packet generating unit 1430 generates the IPDG packet as illustrated in FIGS. 5 through 9, according to the IPDG type determined by the packet control generating unit 1420. Also, the IPDG packet generating unit 1430 generates an IPDG packet regarding signaling information of the IP packet.

The IPDG packet generating unit 1430 can include an IPDC PAT IPDG packet generator 1431, an IPDC-CAT IPDG packet generator 1433, a normal type IPDG packet generator 1432, a DAB-RTP type IPDG packet generator 1434, a compression RTP type IPDG packet generator 1436, and a compression IP type IPDG packet generator 1438. The DAB-RTP type IPDG packet generator 1434 can include a DAB-RTP type IPDG packet generator 1434, a compression RTP type IPDG packet generator 1436, and a compression IP type IPDG packet generator 1438. The IPDC PAT IPDG packet generator 1431 generates an IPDG packet including IPDC-PAT information, and the IPDC-CAT IPDG packet generator 1433 generates an IPDG packet including IPDC-CAT information. The normal type IPDG packet generator 1432 generates a normal type IPDG packet, the DAB-RTP type IPDG packet generator 1434 generates a DAB-RTP type IPDG packet, the compression RTP type IPDG packet generator 1436 generates a compression RTP type IPDG packet, and the compression IP type IPDG packet generator 1438 generates a compression IP type IPDG packet.

The transfer stream packet generating unit 1440 packetizes the IPDG packet as a transfer stream packet. The transfer stream packet can include at least one IPDG packet. The transfer stream packet generating unit 1440 generates a transport stream packet having a size of 188 bytes.

If IPDG packets of at least one different piece of multimedia data which is transferred using transfer stream packets are normal type IPDG packets when the same IPDC service is provided, the transfer stream packet generating unit 1440 assigns the same service identifier SID to the IPDG packets. However, if IPDG packets of at least one different piece of multimedia data which is transferred using transfer stream packets are not normal type IPDG packets, different service identifiers SIDs are respectively assigned to the respective IPDG packets.

Also, if an IPDG packet is divided into a plurality of transfer stream packets, the transfer stream packet generating unit 1440 can represent which part of data of the entire IPDG packet is transmitted through a transfer stream packet, using a pointer field indicating a location of a next IPDG packet or a location of a header of a transfer stream packet for the next IPDG packet, which are contained in a header of the transfer stream packet. Here, the transfer stream packet generating unit 1440 generates the transfer stream packets in such a manner that a transfer stream packet for transferring a first segment of the IPDG packet includes a pointer field having a value "0" in a header, a transfer stream packet for transferring an intermediate segment of the IPDG packet does not include a pointer field (a pointer flag=0) in a header, and a transfer stream packet for transferring a final segment of the IPDG packet includes a pointer field having predetermined bytes of a value in a header.

Also, when the transfer stream packet for transferring the final segment of the IPDG packet is generated, the transfer stream packet generating unit 1440 can generate the transfer stream packet as one of the following three types.

If the same service identifier SID is assigned to IPDG packets of at least one different piece of multimedia data, the transfer stream packet generating unit 1440 generates a transfer stream packet including one or more successive IPDG packets. Also, if different service identifiers SIDs are assigned to an IPDG packet of at least one different piece of multimedia data, the transfer stream packet generating unit 1440 generates a transfer stream packet including an IPDG packet to which a new service identifier SID is assigned after a final segment of the previous IPDG packet. Also, if no different IPDG packet is included in a transfer stream packet, the transfer stream packet generating unit 1440 generates a transfer stream packet including stuffing data following a final segment of an IPDG packet.

The transfer unit 1450 includes an error resistant encoder 1452 and a channel encoder 1454. The error resistant encoder 1452 performs error resistant coding, such as the addition of parity bits, the addition of error resistant codes, etc., on 188 bytes of a transfer stream packet so that the transfer stream packet has error resistance. The channel encoder 1454 performs channel encoding, such as OFDM or VSB, on the resultant transfer stream packet.

Figure 15:
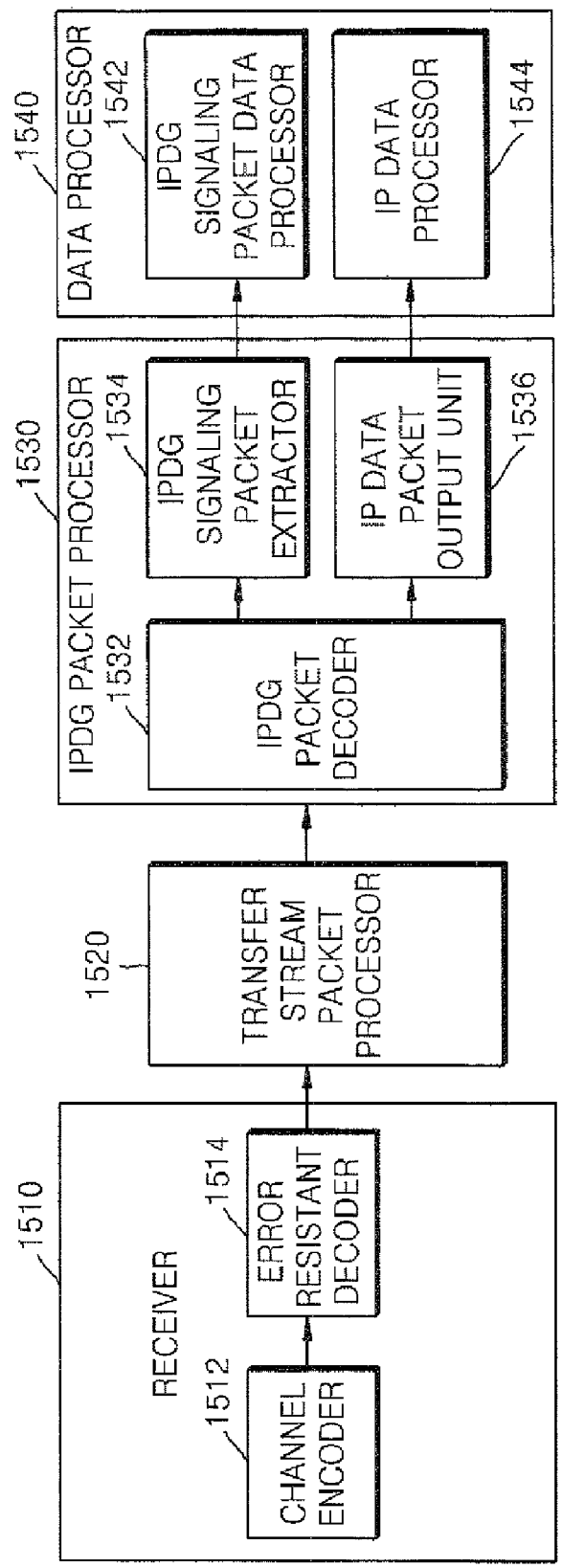
FIG. 15 is a block diagram of an IPDC service processing apparatus according to an exemplary embodiment of the present invention.

FIG. 15 is a block diagram of an IPDC service processing apparatus according to an exemplary embodiment of the present invention. The IPDC service processing apparatus is a broadcast receiver for receiving an IPDC service through a broadcast network and processing the IPDC service, and includes a receiver 1510, a transfer stream packet processor 1520, an IPDG packet processor 1530, and a data processor 1540.

The receiver 1510 receives a transfer stream packet including an IPDG packet obtained by encapsulating an IP packet. The receiver 1510 can include a channel decoder 1512 and an error resistant packet decoder 1514. The channel decoder 1512 channel-decodes data channel-encoded by an IPDC service providing apparatus, according to a predetermined method. The error resistant packet decoder 1514 decodes data encoded for error resistance and generates a 188 byte transfer stream packet.

The transfer stream packet processor 1520 processes the transfer stream packet and extracts an IPDG packet from the transfer stream packet. If an IPDG packet is divided into a plurality of transfer stream packets and the transfer stream packets are transferred, a process of reassembling the IPDG packet is performed.

The IPDG packet processor 1530 extracts an IP packet from the IPDG packet, using type information indicating an IPDG type which is determined on the basis of the characteristics of the IPDC service included in the header of the IPDG packet, and extracts signaling information from the IP packet. The IPDG packet processor 1530 can include an IPDG packet decoder 1532, an IPDG signaling packet extractor 1534, and an IP data packet output unit 1536.

The IPDG packet decoder 1532 divides the IP packet into an IP signaling packet and an IPDG packet for transmitting IP packet data, according to the type information. The IPDG signaling packet extractor 1534 extracts the IP signaling packet from the IP packet, and transfers signaling information of a primary service and a complete service to the IPDC signaling data processor 1542. The IP data packet output unit 1536 transfers the IP packet to an IP data processor 1544 which processes the same SID.

The data processor 1540 includes an IPDG signaling packet data processor 1542 and the IP data processor 1544, and processes IP packets or signaling information of the IP packets. Here, an IP packet is based on the type of an IPDG packet. The term "an IP packet" includes data which is encapsulated into an IPDG packet, as well as a normal IP packet. Data which is processed by the IP data processor 1544 depends on the type of IPDG packet that is to be transmitted, and can vary depending on whether an IPDC service processor is able to process IP packets or headers of IP packets.

If a normal type IPDG packet is received, the IP data packet output unit 1536 outputs a normal IP packet, and the IP data processor 1544 processes the normal IP packet according to a general IP packet processing method.

If the type of an IPDG packet including an IP packet is a DAB-RTP type for transmitting RTP data and information required to process an RTP packet, the IP data processor 1544 accesses RTP data included in a payload of the IPDG packet, using the information required to process the RTP packet, and transfers the RTP data to the data processor 1540. The IP data processor 1542 of the data processing unit 1540 processes the RTP data. If IP and UDP headers are transferred through a different path and the IP packet data processor 1544 has a TCP/IP socket, a method of processing normal IP packets can be used.

If the IPDG packet is a compression RTP type, and has a function for restoring IP, UDP, and RTP headers, the IP data processor 1544 restores compressed IP, UDP, and RTP headers in order to access RTP data, and processes the RTP data. If the IP data processor 1544 does not have the function for restoring IP, UDP, and RTP headers, the IP data processor 1544 accesses RTP data included in a payload of an IPDG packet by using information required to process an RTP packet, and processes the RTP data.

If the type of IPDG packet is a compressed IP type for transmitting compressed IP, UDP, and RTP headers and RTP data, the IP data processor 1544 restores compressed IP, UDP, and RTP headers to access RTP data, and processes the RTP data.

The IPDG signaling packet data processor 1542 of the data processor 1540 processes primary signaling information for a primary service of an IPDC service, and complete signaling information for the remaining IPDC service.

The data processor 1540 processes at least one IP packet included in at least one IPDG packet having the same service identifier SID for identifying an IPDC service included in a header of a transfer stream packet, and provides the IPDC service.

Figure 16:
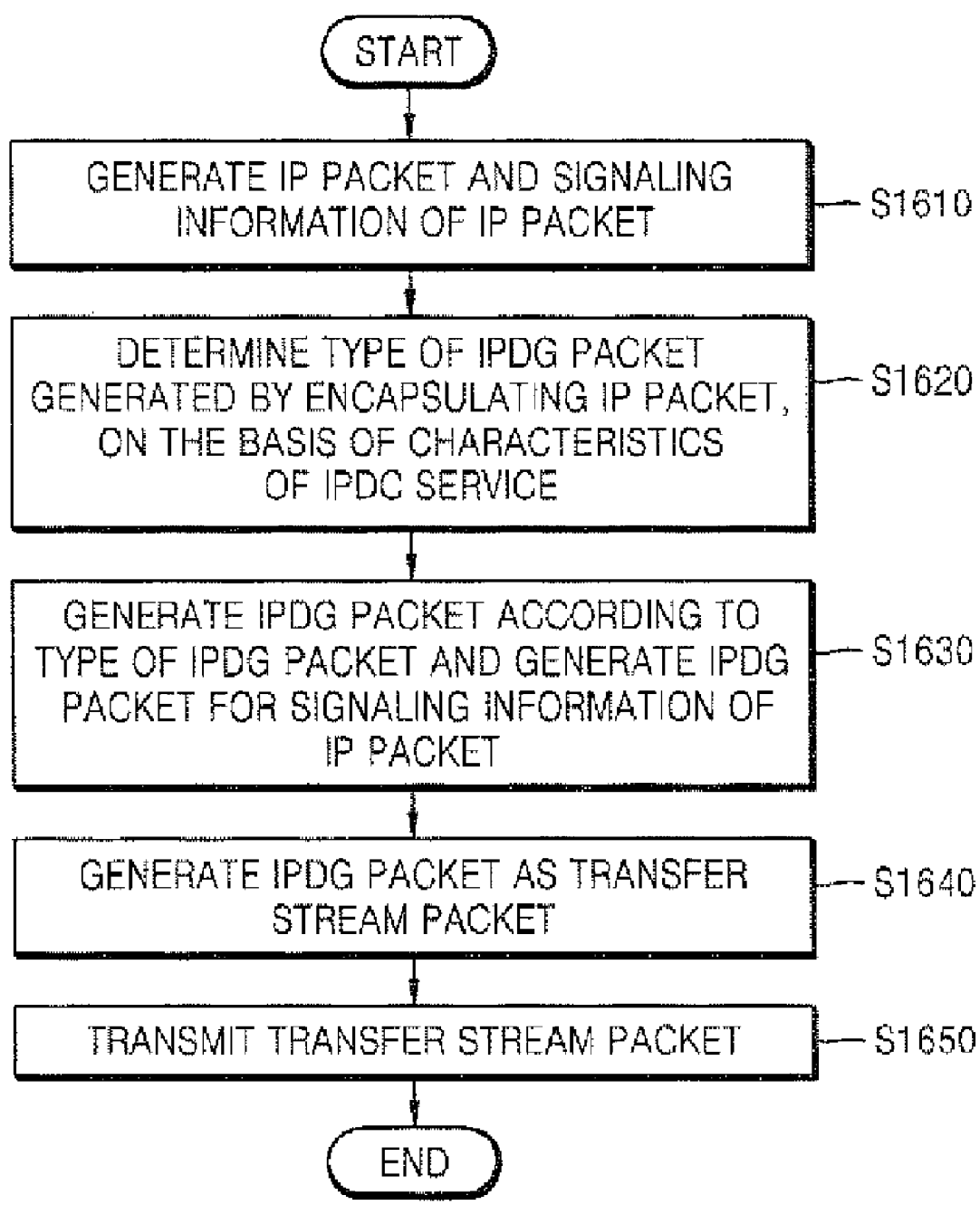
FIG. 16 is a flowchart of an IPDC service providing method according to an exemplary embodiment of the present invention.

FIG. 16 is a flowchart of an IPDC service providing method according to an exemplary embodiment of the present invention.

In operation S1610, an IP packet and signaling information of the IP packet are generated.

In operation S1620, the type of an IPDG packet that is to be generated by encapsulating the IP packet is determined, on the basis of the characteristics of an IPDC service. In operation S1620, if the IPDC service can be provided using only data of an RTP payload, the type of IPDG packet that is to be generated is determined as a DAB-RTP type. If the IPDC service requires header information of the IP packet, the type of IPDG packet that is to be generated is determined as a compressed RTP type. If the IPDC service is provided to a broadcast receiver for receiving an IPDC service which can process the IP packet while reducing a bandwidth, compared to the normal type, the DAB-RTP type, or the compressed RTP type, the type of IPDG packet that is to be generated is determined as a compressed IP type.

In operation S1630, the IPDG packet is generated according to the type of IPDG packet, and an IPDG packet is generated using signaling information of the IP packet In operation S1640, the IPDG packets are generated as a transfer stream packet.

In operation S1650, the transfer stream packet is transmitted.

Figure 17:
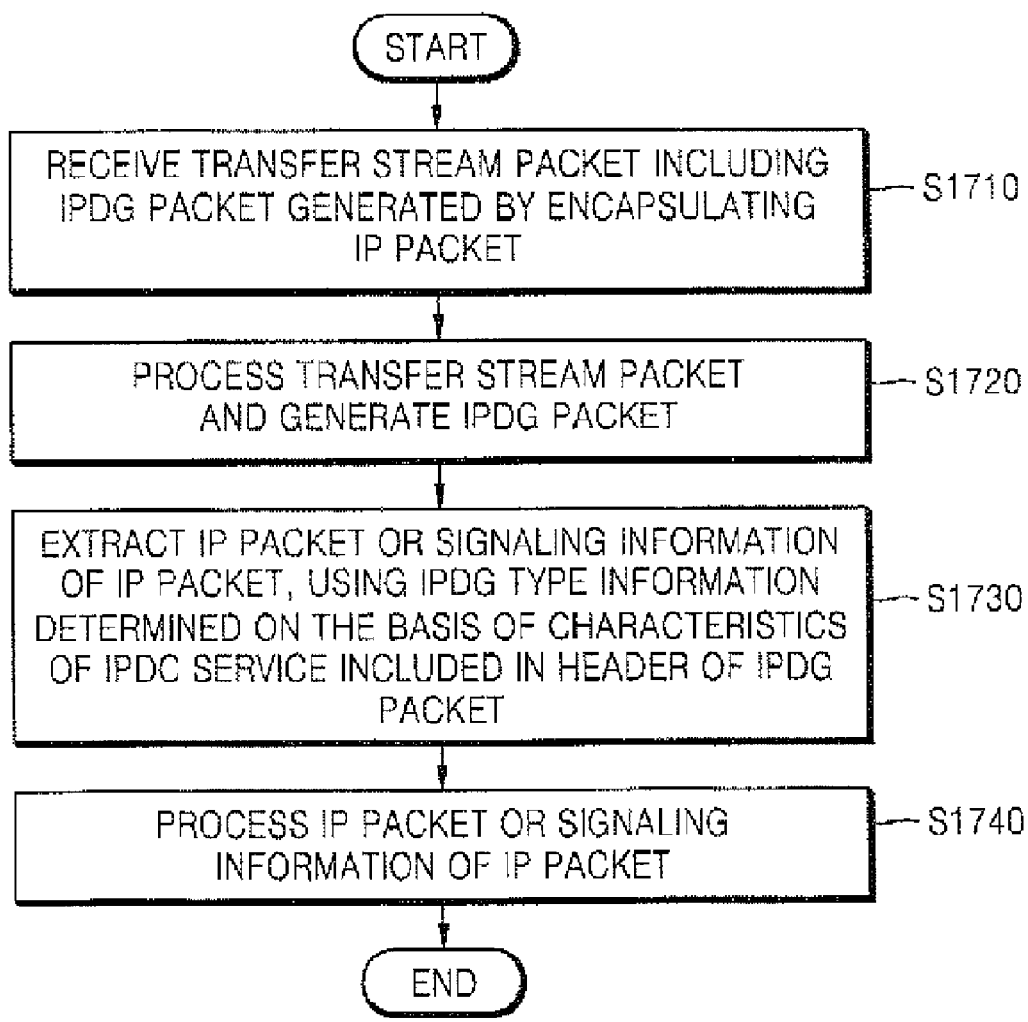
FIG. 17 is a flowchart of an IPDC service processing method according to an exemplary embodiment of the present invention.

FIG. 17 is a flowchart of an IPDC service processing method according to an exemplary embodiment of the present invention.

In operation S1710, a transfer stream packet including an IPDG packet generated by encapsulating an IP packet is received.

In operation S1720, the transfer stream packet is processed, so that the IPDG packet is generated.

In operation S1730, an IP packet or signaling information of the IP packet is extracted from the IPDG packet, using type information indicating an IPDG type determined on the basis of the characteristics of an IPDC service included in a header of the IPDG packet.

In operation S1740, the IP packet or the signaling information of the IP packet is processed.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and other embodiments. The computer readable recording medium can also be distributed over network coupled computer systems so that the computer readable code is stored and executed in a distributed fashion.

According to the present invention, by selectively generating and transmitting IP packet data, as a normal type IPDG packet, a DAB-RTP type IPDG packet, a compression RTP type, or a compression IP type IPDG packet, according to the characteristics of an IPDC service, such as a bandwidth assigned for the IPDC service, a purpose of the IPDC service, or a broadcast receiver type for receiving the IPDC service, it is possible to efficiently use a bandwidth and provide an IPDC service in a DAB (or DMB) system.

Also, according to the present invention, by providing a DAB-RTP type IPDG packet and a compression RTP type IPDG packet, it is possible to provide an IPDC service to a broadcast receiver without a TCP/IP socket.

Also, according to the present invention, by providing a DAB-RTP type IPDG packet and a compression RTP type IPDG packet, an IPDC service can be provided to broadcast receivers with or without a TCP/IP socket.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An Internet Protocol Datacasting (IPDC) service providing method comprising:
   generating at least one IP packet and signaling information of the at least one IP packet;
   determining a type of at least one Internet Protocol Data Group (IPDG) packet that is to be generated by determining whether to generate a normal type IPDG packet, a Digital Audio Broadcasting-Real-time Transport Protocol (DAB-RTP) type IPDG packet, a compressed RTP type IPDG packet, or a compressed IP type IPDG packet based upon characteristics of the IPDC service, and encapsulating the at least one IP packet based upon the determined type of the at least one IPDG packet;
   generating the at least one IPDG packet according to the determined type of the at least one IPDG packet, and generating an IPDG packet regarding the signaling information of the at least one IP packet; and
   generating the at least one IPDG packet according to the determined type of the at least one IPDG packet and the IPDG packet regarding the signaling information of the at least one IP packet, as at least one transfer stream packet; and
   transmitting the at least one transfer stream packet,
   wherein the determining of the type of at least one IPDG packet comprises determining at least a type of payload of the IPDG packet, and
   wherein, determining of the type of the at least one IPDG packet further comprises:
   when the IPDC service can be provided with only data of an RTP payload, the type of the at least one IPDG packet is determined as the DAB-RTP type;
   when the IPDC service requires header information of the at least one IP packet, the type of the at least one IPDG packet is determined as the compressed RTP type; and
   when the IPDC service is provided to a broadcast receiver which receives an IPDC service which is capable of processing a header of a compressed IP packet while reducing an available bandwidth, compared to the normal type, the DAB-RTP type, or the compressed RTP type, the type of the at least one IPDG packet is determined as the compressed IP type.

2. The method of claim 1, wherein the characteristics of the IPDC service include at least one of a bandwidth assigned to provide the IPDC service, a coverage range of the IPDC service, and a broadcast receiver type to which the IPDC service is provided.

3. The method of claim 1, wherein
   the normal type is for transmitting a normal type Internet Protocol (IP) packet having an IP header, a User Datagram Protocol (UDP) header, and a Real-time Transport Protocol (RTP) header,
   the Digital Audio Broadcasting-Real-time Transport Protocol (DAB-RTP) type is for transmitting RTP data and information required to process at least one RTP packet,
   the compressed RTP type is for transmitting information required to process RTP data, a RTP packet, and compressed IP, UDP, and RTP headers, and
   the compressed IP type is for transmitting RTP data and compressed IP, UDP, and RTP headers.

4. The method of claim 3, wherein the information required to process the at least one RTP packet includes a time stamp and a sequence number which are contained in an RTP header of an original IP packet.

5. The method of claim 3, wherein, if the type of the at least one IPDG packet is the compressed RTP type, the at least one IPDG packet includes a pointer field respectively for representing a location of an RTP payload to allow a broadcast receiver which is not capable of processing the IP packet to access the RTP payload.

6. The method of claim 1, wherein the at least one transfer stream packet includes at least one IPDG packet and has a size of 188 bytes.

7. The method of claim 1, wherein the generating of the at least one transfer stream packet comprises:
   when the at least one IPDG packet which is transmitted through the at least one transfer stream packet is a normal type, assigning a same service identifier to the at least one IPDG packet; and
   when the at least one IPDG packet which is transmitted through the at least one transfer stream packet is not a normal type, assigning a separate service identifier to the at least one IPDG packet.

8. The method of claim 1, wherein, the generating of the at least one transfer stream packet comprises:
   if one IPDG packet is divided into a plurality of transfer stream packets, a header of each transfer stream packet includes a pointer field indicating a location of a next IPDG packet or a location of a header of a transfer stream packet for the next IPDG packet, thereby indicating that an IPDG packet transmitted through each transfer stream packet corresponds to which segment of the IPDG packet.

9. The method of claim 1, wherein, the generating of the at least one transfer stream packet comprises:
   in the case where the at least one IPDG packet is divided into a plurality of transfer stream packets, if a same service identifier is assigned to the at least one IPDG packet when a transfer stream packet transmitting a final segment of the at least one IPDG packet is generated,
   a next IPDG packet is successively included in the transfer stream packet.

10. The method of claim 1, wherein, the generating of the at least one transfer stream packet comprises:
    in the case where the one IPDG packet is divided into a plurality of transfer stream packets, if a separate service identifier is assigned to the at least one IPDG packet when a transfer stream packet transmitting a final segment of the one IPDG packet is generated,
    the transfer stream packet includes an IPDG packet to which a new service identifier is assigned and which follows the final segment of the one IPDG packet.

11. The method of claim 1, wherein, the generating of the at least one transfer stream packet comprises
    in the case where the one IPDG packet is divided into a plurality of transfer stream packets,
    if a transfer stream packet transmitting a final segment of the one IPDG packet is generated in such a manner that no different IPDG packet is included in the transfer stream packet,
    stuffing data is included in the transfer stream packet, following the final segment of the one IPDG packet.

12. An Internet Protocol Datacasting (IPDC) service providing apparatus comprising:
a data input unit generating at least one Internet Protocol (IP) packet and signaling information of the at least one IP packet;
a packet generation control unit determining a type of at least one Internet Protocol Data Group (IPDG) packet that is to be generated by determining whether to generate a normal type IPDG packet, a Digital Audio Broadcasting-Real-time Transport Protocol (DAB-RTP) type IPDG packet, a compressed RTP type IPDG packet, or a compressed IP type IPDG packet based upon characteristics of the IPDC service, and encapsulating the at least one IP packet based upon the determined type of the at least one IPDG packet;
an IPDG packet generation unit generating the at least one IPDG packet according to the determined type of the at least one IPDG packet, and generating an IPDG packet regarding the signaling information of the at least one IP packet;
a transfer stream packet generation unit generating the at least one IPDG packet according to the determined type of the at least one IPDG packet and the IPDG packet regarding the signaling information of the at least one IP packet, as at least one transfer stream packet; and
a transfer unit transmitting the at least one transfer stream packet
wherein the packet generation control unit is configured to determine at least one IPDG at least a type of payload of the IPDG packet, and
wherein the packet generation control unit determines the type of the at least one IPDG packet as the DAB-RTP type when the IPDC service can be provided with only data of an RTP payload, determines the type of the at least one IPDG packet as the compressed RTP type when the IPDC service requires header information of the at least one IP packet, and determines the type of the at least one IPDG packet as the compressed IP type, when the IPDC service is provided to a broadcast receiver which receives an IPDC service which is capable of processing a header of a compressed IP packet while reducing an available bandwidth, compared to the normal type, the DAB-RTP type, or the compressed RTP type.

13. The apparatus of claim 12, wherein the characteristics of the IPDC service includes at least one of a bandwidth assigned to provide the IPDC service, a coverage range of the IPDC service, and a broadcast receiver type to which the IPDC service is provided.

14. The apparatus of claim 12, wherein the
normal type is for transmitting a normal type IP packet having an IP header, a User Datagram Protocol (UDP), and a Real-time Transport Protocol (RTP) header,
the Digital Audio Broadcasting-Real-time Transport Protocol (DAB-RTP) type is for transmitting RTP data and information required to process a RTP packet,
the compressed RTP type is for transmitting information required to process an RTP packet, compressed IP, UDP, and RTP headers, and RTP data, and
the compressed IP type is for transmitting RTP data and compressed IP, UDP, and RTP headers.

15. The apparatus of claim 14, wherein the information required to process the at least one RTP packet includes a time stamp and a sequence number which are contained in an RTP header of an original IP packet.

16. The apparatus of claim 14, wherein, if the type of the at least one IPDG packet is the compressed RTP type, the at least one IPDG packet includes a pointer field respectively for representing a location of an RTP payload to allow a broadcast receiver which is not capable of processing the at least one IP packet to access the RTP payload.

17. The apparatus of claim 12, wherein the transfer stream packet includes at least one IPDG packet and has a size of 188 bytes.

18. The apparatus of claim 12, wherein the transfer stream packet generation unit,
assigns a same service identifier to the at least one IPDG packet, if the at least one IPDG packet which is transmitted through the at least one transfer stream packet is a normal type, and
assigns a separate service identifier to the at least one IPDG packet, if the at least one IPDG packet which is transmitted through the at least one transfer stream packet is not a normal type.

19. The apparatus of claim 12, wherein, if the at least one IPDG packet is divided into a plurality of transfer stream packets, the transfer stream packet generation unit indicates that an IPDG packet transmitted through each transfer stream packet corresponds to which segment of the IPDG packet, using a pointer field which is included in a header of each transfer stream packet and indicates a location of a next IPDG packet or a location of a header of a transfer stream packet for the next IPDG packet.

20. The apparatus of claim 12, wherein, in the case where the one IPDG packet is divided into a plurality of transfer stream packets, if a same service identifier is assigned to the at least one IPDG packet when a transfer stream packet transmitting a final segment of the one IPDG packet is generated, the transfer stream packet generation unit generates the transfer stream packet in such a manner that a next IPDG packet is successively included in the transfer stream packet.

21. The apparatus of claim 12, wherein, in the case where the one IPDG packet is divided into a plurality of transfer stream packets, if a separate service identifier is assigned to the at least one IPDG packet when a transfer stream packet transmitting a final segment of the one IPDG packet is generated, the transfer stream packet generation unit generates the transfer stream packet in such a manner that the transfer stream packet includes an IPDG packet to which a new service identifier is assigned and which follows the final segment of the one IPDG packet.

22. The apparatus of claim 12, wherein, in the case where one IPDG packet is divided into a plurality of transfer stream packets, if a transfer stream packet transmitting a final segment of the one IPDG packet is generated in such a manner that no different IPDG packet is included in the transfer stream packet, the transfer stream packet generation unit generates the transfer stream packet, in such a manner that stuffing data is included in the transfer stream packet, following the final segment of the one IPDG packet.

23. An Internet Protocol Datacasting (IPDC) service processing method comprising:
receiving at least one transfer stream packet including at least one Internet Protocol Data Group (IPDG) packet generated by determining whether to generate a normal type IPDG packet, a Digital Audio Broadcasting-Real-time Transport Protocol (DAB-RTP) type IPDG packet, a compressed RTP type IPDG packet, or a compressed IP type IPDG packet based upon characteristics of the IPDC service and encapsulating at least one Internet Protocol (IP) packet based upon the determined type of the at least one IPDG packet;

processing the at least one transfer stream packet and generating the at least one IPDG packet;

extracting the at least one IP packet and a signaling information of the at least one IP packet, from the at least one IPDG packet, using type information indicating an IPDG packet type which is included in a header of the at least one IPDG packet and determined on the basis of characteristics of the IPDC service; and processing the at least one IP packet and the signaling information of the at least one IP packet, and wherein the type information comprises payload type information, and wherein the processing of the at least one IP packet comprises:

in a case where the type of the at least one IPDG packet including the at least one IP packet is a compressed RTP type for transmitting information required to process the RTP packet, compressed IP, UDP, and RTP headers, and RTP data, if a function for restoring the compressed IP, UDP, and RTP headers is provided, restoring the compressed IP, UDP, and RTP headers to process the RTP data, and if no function for restoring the compressed IP, UDP, and RTP headers is provided, processing RTP data included in the payload of the at least one IPDG packet using the information required to process the RTP packet.

24. The method of claim 23, wherein the characteristics of the IPDC service includes at least one of a bandwidth assigned to provide the IPDC service, a coverage range of the IPDC service, and a broadcast receiver type to which the IPDC service is provided.

25. The method of claim 23, wherein
the normal type is for transmitting at least one normal type IP packet having an IP header, a User Datagram Protocol (UDP) header, and an Real-time Transport Protocol (RTP) header,
the Digital Audio Broadcasting-Real-time Transport Protocol (DAB-RTP) type is for transmitting RTP data and information required to process a RTP packet,
the compressed RTP type is for transmitting information required to process a RTP packet, compressed IP, UDP, and RTP headers, and RTP data, and
the compressed IP type is for transmitting RTP data and compressed IP, UDP, and RTP headers.

26. The method of claim 25, wherein the information required to process the RTP packet includes a time stamp and a sequence number which are contained in an RTP header of an original IP packet.

27. The method of claim 23, wherein, if the type of the at least one IPDG packet is a DAB-RTP type for transmitting information required to process at least one RTP packet and RTP data, the processing of the at least one IP packet comprises processing RTP data included in a payload of the at least one IPDG packet using information required to process the RTP packet.

28. The method of claim 23, wherein the processing of the at least one IP packet comprises restoring compressed IP, UDP, and RTP headers and processing RTP data, if the type of the at least one IPDG packet including the at least one IP packet is a compressed IP type for transmitting compressed IP, UDP, and RTP headers and RTP data.

29. The method of claim 23, wherein the processing of the signaling information of the at least one IP packet comprises:
processing primary signaling information for a primary service of the IPDC service; and
processing complete signaling information for the remaining services of the IPDC service.

30. The method of claim 23, wherein the processing of the at least one IP packet comprises processing at least one IP packet included in at least one IPDG packet in which a same service identifier (SID) for identifying an IPDC service included in a header of at least one transfer stream packet is included, and providing the IPDC service.

31. An Internet Protocol Datacasting (IPDC) service processing apparatus comprising:

a receiver receiving at least one transfer stream packet including at least one Internet Protocol Data Group (IPDG) packet generated by determining whether to generate a normal type IPDG packet, a Digital Audio Broadcasting-Real-time Transport Protocol (DAB-RTP) type IPDG packet, a compressed RTP type IPDG packet, or a compressed IP type IPDG packet based upon characteristics of the IPDC service and encapsulating at least one IP packet based upon the determined type of the at least one IPDG packet;

a transfer stream packet processing unit processing the at least one transfer stream packet and generating the at least one IPDG packet;

an IPDG packet processing unit extracting the at least one Internet Protocol (IP) packet or signaling information of the at least one IP packet, from the at least one IPDG packet, using type information indicating an IPDG packet type determined on the basis of characteristics of an IPDC service included in a header of the at least one IPDG packet; and a data processing unit processing the at least one IP packet or the signaling information of the at least one IP packet, wherein the type information comprises payload type information, and wherein, if the type of the at least one IPDG packet including the at least one IP packet is a compressed RTP type for transmitting information required to process the RTP packet, compressed IP, UDP, and RTP headers, and RTP data, the data processing unit, restores the compressed IP, UDP, and RTP headers to process the RTP data, if a function for restoring the compressed IP, UDP, and RTP headers is provided, and processes an RTP payload included in a payload of the at least one IPDG packet using the information required to process the RTP packet, if no function for restoring the compressed IP, UDP, and RTP headers is provided.

32. The apparatus of claim 31, wherein the characteristics of the IPDC service includes at least one of a bandwidth assigned to provide the IPDC service, a coverage range of the IPDC service, and a broadcast receiver type to which the IPDC service is provided.

33. The apparatus of claim 31, wherein the
normal type is for transmitting at least one normal type IP packet having an IP header, a User Datagram Protocol (UDP) header, and an Real-time Transport Protocol (RTP) header,
the Digital Audio Broadcasting-Real-time Transport Protocol (DAB-RTP) type is for transmitting RTP data and information required to process a RTP packet,
the compressed RTP type is for transmitting information required to process a RTP packet, compressed IP, UDP, and RTP headers, and RTP data, and
the compressed IP type is for transmitting RTP data and compressed IP, UDP, and RTP headers.

34. The apparatus of claim 33, wherein the information required to process the RTP packet includes a time stamp and a sequence number which are contained in an RTP header of an original IP packet.

35. The apparatus of claim 31, wherein, if the type of the at least one IPDG packet including the at least one IP packet is a DAB-RTP type for transmitting RTP data and information required to process the RTP packet, the data processing unit processes an RTP payload of the at least one IPDG packet using the information required to process the RTP packet.

36. The apparatus of claim 31, wherein, if the type of the at least one IPDG packet including the at least one IP packet is a compressed IP type for transmitting the RTP data and the compressed IP, UDP, and RTP headers, the data processing unit restores the compressed IP, UDP, and RTP headers to process a RTP payload of the at least one IPDG packet.

37. The apparatus of claim 31, wherein the data processing unit processes primary signaling information for a primary service of the IPDC service, and processes complete signaling information for the remaining IPDC services of the IPDC service, when the signaling information of the at least one IP packet is processed.

38. The apparatus of claim 31, wherein the data processing unit processes at least one IP packet included in at least one IPDG packet in which a same service identifier (SID) for identifying an IPDC service included in a header of at least one transfer stream packet is included, and provides the IPDC service.

39. A non-transitory computer-readable recording medium having embodied thereon a program for executing an Internet Protocol Datacasting (IPDC) service providing method comprising:
  generating at least one Internet Protocol (IP) packet and signaling information of the at least one IP packet;
  determining a type of at least one Internet Protocol Data Group (IPDG) packet that is to be generated by determining whether to generate a normal type IPDG packet, a Digital Audio Broadcasting-Real-time Transport Protocol (DAB-RTP) type IPDG packet, a compressed RTP type IPDG packet, or a compressed IP type IPDG packet based upon characteristics of the IPDC service and encapsulating the at least one IP packet, on the basis of characteristics of the IPDC service based upon the determined type of the at least one IPDG packet;
  generating the at least one IPDG packet according to the type of the at least one IPDG packet, and generating an IPDG packet regarding the signaling information of the at least one IP packet; and
  generating the at least one IPDG packet according to the type of the at least one IPDG packet and the IPDG packet regarding the signaling information of the at least one IP packet, as at least one transfer stream packet; and
  transmitting the at least one transfer stream packet,
  wherein the determining of the type of at least one IPDG packet comprises determining at least a type of payload of the IPDG packet, and
  wherein, determining of the type of the at least one IPDG packet further comprises:
    when the IPDC service can be provided with only data of an RTP payload, the type of the at least one IPDG packet is determined as the DAB-RTP type;
    when the IPDC service requires header information of the at least one IP packet, the type of the at least one IPDG packet is determined as the compressed RTP type; and
    when the IPDC service is provided to a broadcast receiver which receives an IPDC service which is capable of processing a header of a compressed IP packet while reducing an available bandwidth, compared to the normal type, the DAB-RTP type, or the compressed RTP type, the type of the at least one IPDG packet is determined as the compressed IP type.

40. A non-transitory computer-readable recording medium having embodied thereon a program for executing an Internet Protocol Datacasting (IPDC) service processing method comprising:
  receiving at least one transfer stream packet including at least one Internet Protocol Data Group (IPDG) packet generated by determining whether to generate a normal type IPDG packet, a Digital Audio Broadcasting-Real-time Transport Protocol (DAB-RTP) type IPDG packet, a compressed RTP type IPDG packet, or a compressed IP type IPDG packet based upon characteristics of the IPDC service and encapsulating at least one IP packet based upon the determined type of the at least one IPDG packet;
  processing the at least one transfer stream packet and generating the at least one IPDG packet;
  extracting the at least one IP packet and a signaling information of the at least one IP packet, from the at least one IPDG packet, using type information indicating an IPDG packet type included in a header of the at least one IPDG packet and determined on the basis of characteristics of the IPDC service; and
  processing the at least one IP packet and the signaling information of the at least one IP packet, and
  wherein the type information comprises payload type information, and
  wherein the processing of the at least one IP packet comprises:
    in a case where the type of the at least one IPDG packet including the at least one IP packet is a compressed RTP type for transmitting information required to process the RTP packet, compressed IP, UDP, and RTP headers, and RTP data, if a function for restoring the compressed IP, UDP, and RTP headers is provided, restoring the compressed IP, UDP, and RTP headers to process the RTP data, and
    if no function for restoring the compressed IP, UDP, and RTP headers is provided, processing RTP data included in the payload of the at least one IPDG packet using the information required to process the RTP packet.

* * * * *